United States Patent
Cohen et al.

(10) Patent No.: US 9,556,379 B2
(45) Date of Patent: Jan. 31, 2017

(54) CONTROLLED SYNTHESIS OF BRIGHT AND COMPATIBLE LANTHANIDE-DOPED UPCONVERTING NANOCRYSTALS

(75) Inventors: Bruce E. Cohen, San Francisco, CA (US); Alexis D. Ostrowski, Bowling Green, OH (US); Emory M. Chan, Oakland, CA (US); Daniel J. Gargas, Berkeley, CA (US); Elan M. Katz, Berkeley, CA (US); P. James Schuck, Oakland, CA (US); Delia J. Milliron, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 214 days.

(21) Appl. No.: 14/344,863

(22) PCT Filed: Sep. 14, 2012

(86) PCT No.: PCT/US2012/055587
§ 371 (c)(1),
(2), (4) Date: Jan. 9, 2015

(87) PCT Pub. No.: WO2013/040464
PCT Pub. Date: Mar. 21, 2013

(65) Prior Publication Data
US 2016/0168459 A1    Jun. 16, 2016

Related U.S. Application Data

(60) Provisional application No. 61/535,529, filed on Sep. 16, 2011.

(51) Int. Cl.
*C09K 11/77* (2006.01)

(52) U.S. Cl.
CPC .................. *C09K 11/7773* (2013.01)

(58) Field of Classification Search
CPC ..................... C09K 11/77; Y10T 428/2982
USPC ........................................ 428/402
See application file for complete search history.

(56) References Cited

U.S. PATENT DOCUMENTS

| | | | |
|---|---|---|---|
| 4,042,527 A * | 8/1977 | Kano ................. | C09K 11/7773 252/301.4 H |
| 2006/0003466 A1 * | 1/2006 | Yi ...................... | C09K 11/7772 436/526 |
| 2009/0042314 A1 * | 2/2009 | Capobianco ........... | B82Y 15/00 436/501 |
| 2009/0061461 A1 * | 3/2009 | Cahill .................. | C07K 14/721 435/7.21 |

OTHER PUBLICATIONS

Shan et al., "Controlled synthesis of lanthanide doped " Applied Physics Letters, vol. 91, Issue12, Article No. 123103, Sep. 2007, p. 1-3.*
Wu et al., "Non-blinking and photostable upconverted luminescence from single lanthanide . . . " Proceedings of the National Academy of Sciences of the United States of Americe, Jul. 2009, vol. 106, No. 27, p. 10917-10921 and suppl. pages.*
Shan et. al., "A single-step synthesis and the kinetic mechanism for monodisperse and hexagonal-phase NaYF4:Yb, Er upconversion nanophosphors" Nanotechnology, vol. 20, pp. 1-13, (2000).
Shan et. al., "An investigation of the thermal sensitivity and stability of the b-NaYF4 :Yb,Er upconversion nanophosphors" Journal of Applied Physics, vol. 107, pp. 054901-1-054901-5, (2010).
Mai et. al., "Size- and Phase-Controlled Synthesis of Monodisperse NaYF4:Yb,Er Nanocrystals from a Unique Delayed Nucleation Pathway Monitored with Upconversion Spectroscopy" Journal of Physical Chemistry C., vol. 111, pp. 13730-13739, (2007).

* cited by examiner

*Primary Examiner* — Leszek Kiliman
(74) *Attorney, Agent, or Firm* — Lawrence Berkeley National Laboratory

(57) ABSTRACT

Certain nanocrystals possess exceptional optical properties that may make them valuable probes for biological imaging, but rendering these nanoparticles biocompatible requires that they be small enough not to perturb cellular systems. This invention describes a phosphorescent upconverting sub-10 nm nanoparticle comprising a lanthanide-doped hexagonal β-phase $NaYF_4$ nanocrystal and methods for making the same.

12 Claims, 18 Drawing Sheets

CONTROLLED SYNTHESIS OF BRIGHT AND COMPATIBLE LANTHANIDE-DOPED UPCONVERTING NANOCRYSTALS

CROSS REFERENCE TO RELATED APPLICATIONS

This application claims priority to PCT Application PCT/US2012/055587, filed Sep. 14, 2012, which in turn claims priority to U.S. Provisional Application Ser. No. 61/535,529 filed Sep. 16, 2011, which application is incorporated herein by reference as if fully set forth in their entirety.

STATEMENT OF GOVERNMENTAL SUPPORT

The invention described and claimed herein was made in part utilizing funds supplied by the U.S. Department of Energy under Contract No. DE-AC02-05CH11231 between the U.S. Department of Energy and the Regents of the University of California for the management and operation of the Lawrence Berkeley National Laboratory. The government has certain rights in this invention.

BACKGROUND OF THE INVENTION

Field of the Invention

Nanocrystals that have unusual or exceptional optical properties have shown promise as transformative probes for biological imaging A key requirement for use in bioimaging is that the nanocrystals be biocompatible, and for many experiments this means that they need to be comparable in size to the biomolecules that they intend to label, so as not to interfere with cellular systems. Lanthanide-doped upconverting nanoparticles (UCNPs) are especially promising probes for single-particle tracking. However, the synthesis of sub-10-nm $\beta$-NaYF$_4$, the crystal structure that hosts the most efficient upconversion, has not yet been reported, and questions remain about whether small $\beta$-Phase sodium yttrium fluorides ($\beta$-NaYF$_4$) nanocrystals would retain the exceptional optical properties exhibited by larger UCNPs.

Synthetic methodologies that enable precise size control have been developed for several nanocrystals that have begun to find wider use in bioimaging, such as gold nanoparticles and semiconductor quantum dots. In addition, the syntheses of these particular nanocrystals can produce nearly mono-dispersable nanocrystals in the size range of most membrane and globular proteins (ca. 4-10 nm). Nanoparticles significantly larger than the biomolecules to which they are targeted may have limited accessibility to smaller subcellular structures, perturb protein trafficking patterns, retard diffusion, interfere with protein function or binding events, or alter pharmacokinetics in whole animal experiments.

Prior art synthetic methods for phosphorescent upconverting nanoparticles (UCNPs), which can be excited with continuous-wave 980-nm lasers and show upconverted phosphorescence at visible or nIR wavelengths, have not been successful at producing bright nanocrystals less than 10 nm in diameter. However, $\beta$-Phase nanocrystals of NaYF$_4$ doped with lanthanide phosphors that have optical transitions in the visible region are especially promising for single particle tracking experiments, as they show no measurable photobleaching and remain consistently luminescent, without the on/off blinking exhibited by other probes, even over hours of continuous excitation.

Of the different UCNP nanocrystal matrices that have been reported, hexagonal $\beta$-phase NaYF$_4$ has been shown to have superior brightness to other compositions, and are 1-2 orders of magnitude brighter than comparable cubic $\alpha$-NaYF$_4$. Most $\beta$-phase NaYF$_4$ synthetic methods have reported a single size of nanoparticle in the 15- to 40-nm range, with good monodispersity but little apparent control over size. Smaller UCNPs have included 7-nm lanthanide-doped NaYF$_4$ nanoparticles, but in the cubic $\alpha$-phase, 11-nm Yb—Tm doped $\beta$-phase NaYF$_4$, and 11-nm Gd—Yb—Er—Tm doped $\beta$-phase NaYF$_4$.

Embodiments of the invention describe synthetic control over lanthanide-doped $\beta$-phase NaYF$_4$, down to 5 nm in diameter, and demonstrate that, like the >20 nm nanocrystals, these smaller nanocrystals do not blink or photobleach. Alternative embodiments of the invention disclose that an addition of an undoped shell to the smaller nanocrystals leads to 10-nm nanocrystals that are brighter than cores as large as 30 nm.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

In the discussions that follow, various process steps may or may not be described using certain types of manufacturing equipment, along with certain process parameters. It is to be appreciated that other types of equipment can be used, with different process parameters employed, and that some of the steps may be performed in other manufacturing equipment without departing from the scope of this invention. Furthermore, different process parameters or manufacturing equipment could be substituted for those described herein without departing from the scope of the invention.

These and other details and advantages of the present invention will become more fully apparent from the following description taken in conjunction with the accompanying drawings.

Some embodiments of the invention address synthetic control over β-phase NaYF$_4$ nanocrystal size utilizing a rare-earth trifluoroacetate decomposition reaction, a 2-step sequence that first produces β-phase nanocrystals that are then heated to 330° C. to form monodisperse 20-30 nm β-NaYF$_4$. Attempts to isolate sub 10-nm β-phase nanocrystals from this embodiment were partially successful, although eliminating oleic acid from the reaction did produce 10-nm β-NaYF$_4$ in the first step. These particles were strongly prone to aggregation and could not be transferred to water as individual nanocrystals.

Because trifluoroacetate decomposition requires cleavage of a covalent bond to produce F$^-$, it was understood that this may be inefficient at producing F$^-$ and would limit nucleation, leading to fewer, larger nanoparticles. As a more efficient F$^-$ source, embodiments of the invention combined ammonium fluoride (NH$_4$F) with oleylamine and undertook a combinatorial screen varying reaction temperature, time, Y$^{3+}$:F$^-$ ratio, Na$^+$ stoichiometry, and surfactant concentrations. In a typical reaction, rare-earth oleates were prepared from their chlorides and heated along with solid NH$_4$F, sodium oleate, and other surfactants in 1-octadecene to 300-330° C. (see below for further details). Reactions under these conditions produced either pure β-phase nanocrystals or mixtures of α- and β-phases. Phase diagrams of bulk sodium yttrium fluorides suggest that β-phase formation is disfavored under most conditions, except a narrow window in which the 1:1:4 stoichiometry of Na$^+$, Y$^{3+}$, and F$^-$ is strictly maintained.

Figure 2:
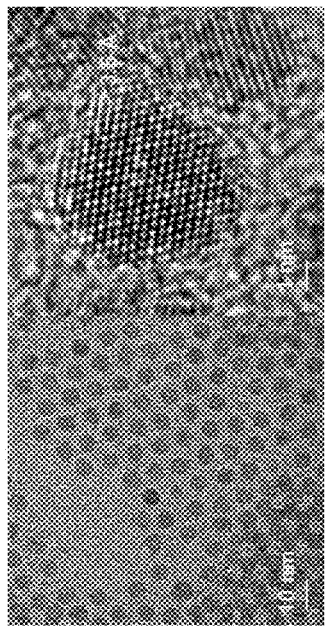
FIG. 2 illustrates TEM images of the $\beta$-NaYF$_4$: 2% Er$^{3+}$, 20% Yb$^{3+}$ nanoparticles with an average diameter of 5.4±0.6 nm. Lattice spacing is 3.5 Å.

FIG. 2 illustrates the effect of the addition of increasing oleylamine on the size and phase of the NaYF$_4$: 2% Er$^{3+}$, 20% Yb$^{3+}$ nanocrystals. Reactions were heated at 310° C. for 45 min, and sizes determined by dynamic light scattering (DLS) in hexane. β-Phase nanoparticles are shown as blue triangles, α-phase or mixed phases as orange circles, and averages as closed black circles.

Figure 1:
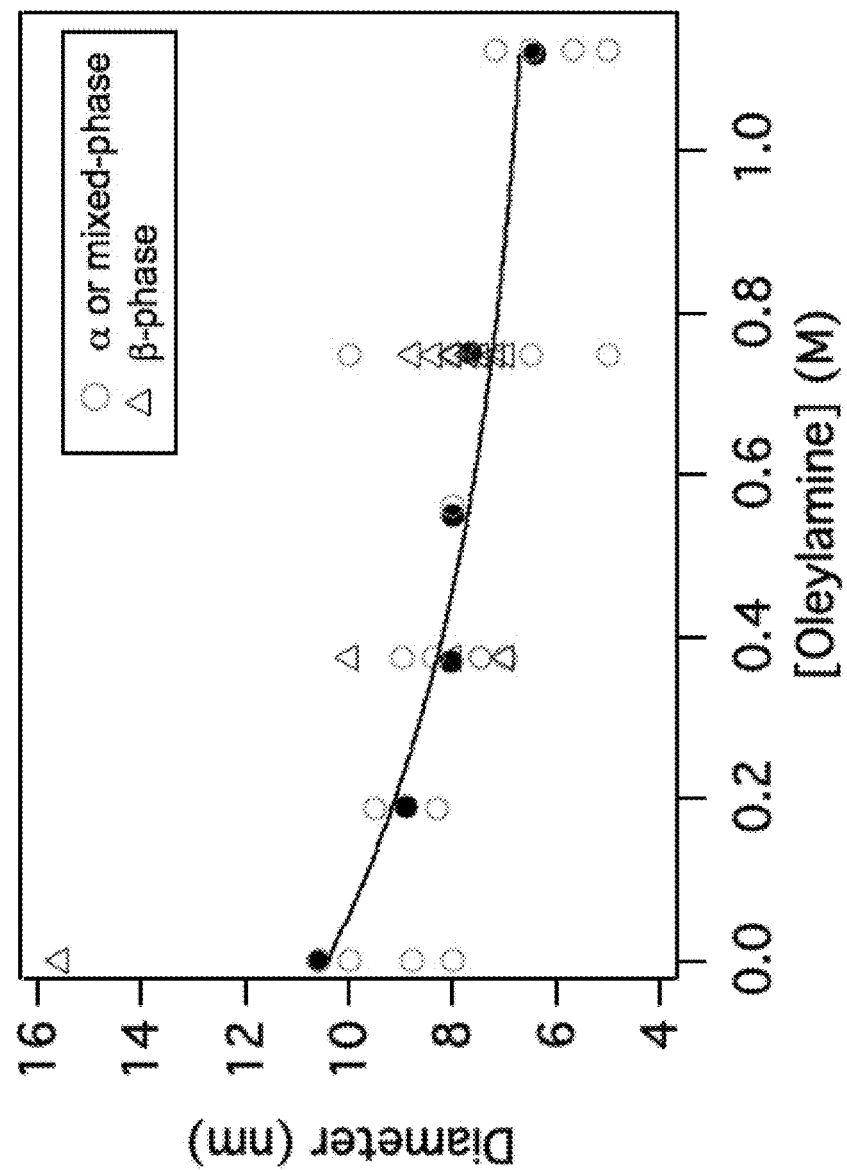
FIG. 1 illustrates the effect of addition of increasing oleylamine on the size and phase of the NaYF$_4$ nanocrystal according to an embodiment of the invention.
Figure 8:
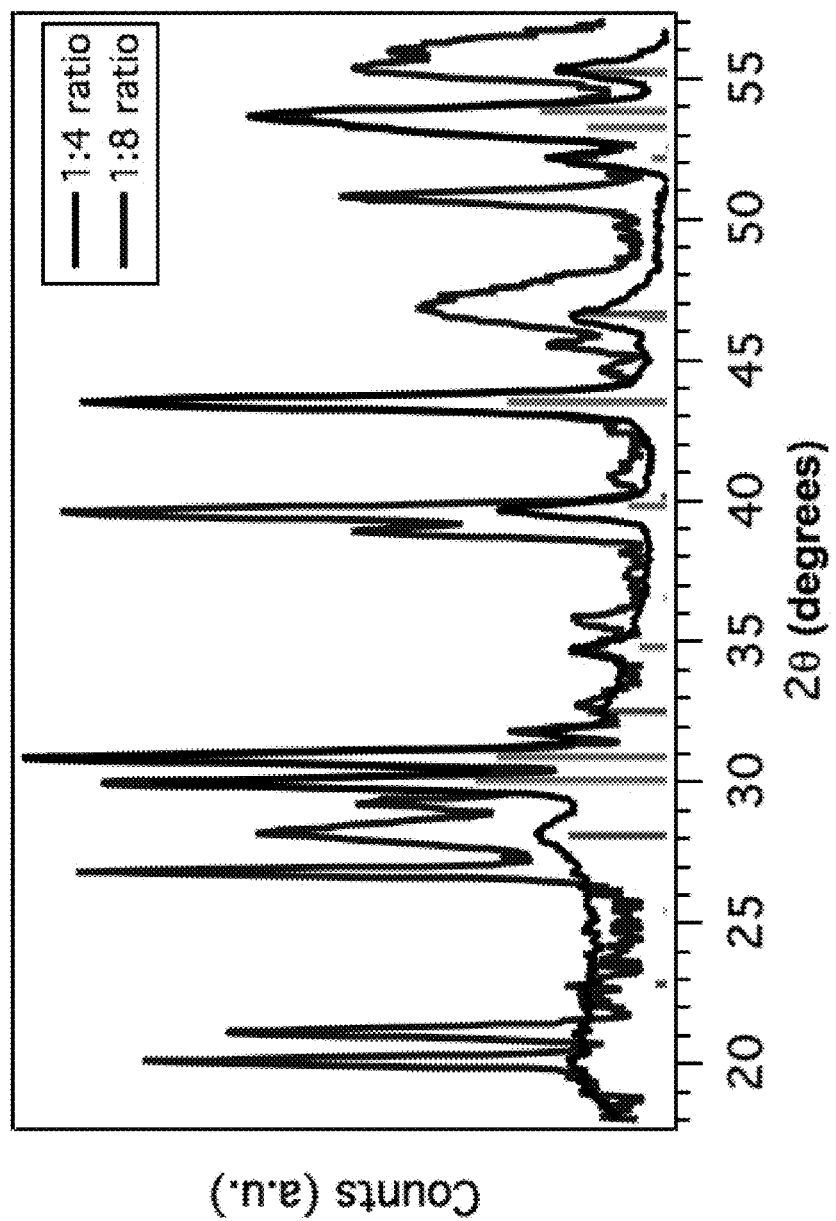
FIG. 8 illustrates XRD of samples prepared with a 1:4 (black) and 1:8 (blue) Y$^{3+}$ to F$^-$ ratio at 310° C. heated for 45 min. The sample with 1:8 ratio shows many other impurities besides the $\alpha$ or $\beta$-phase NaYF$_4$ according to an embodiment of the invention.
Figure 9:
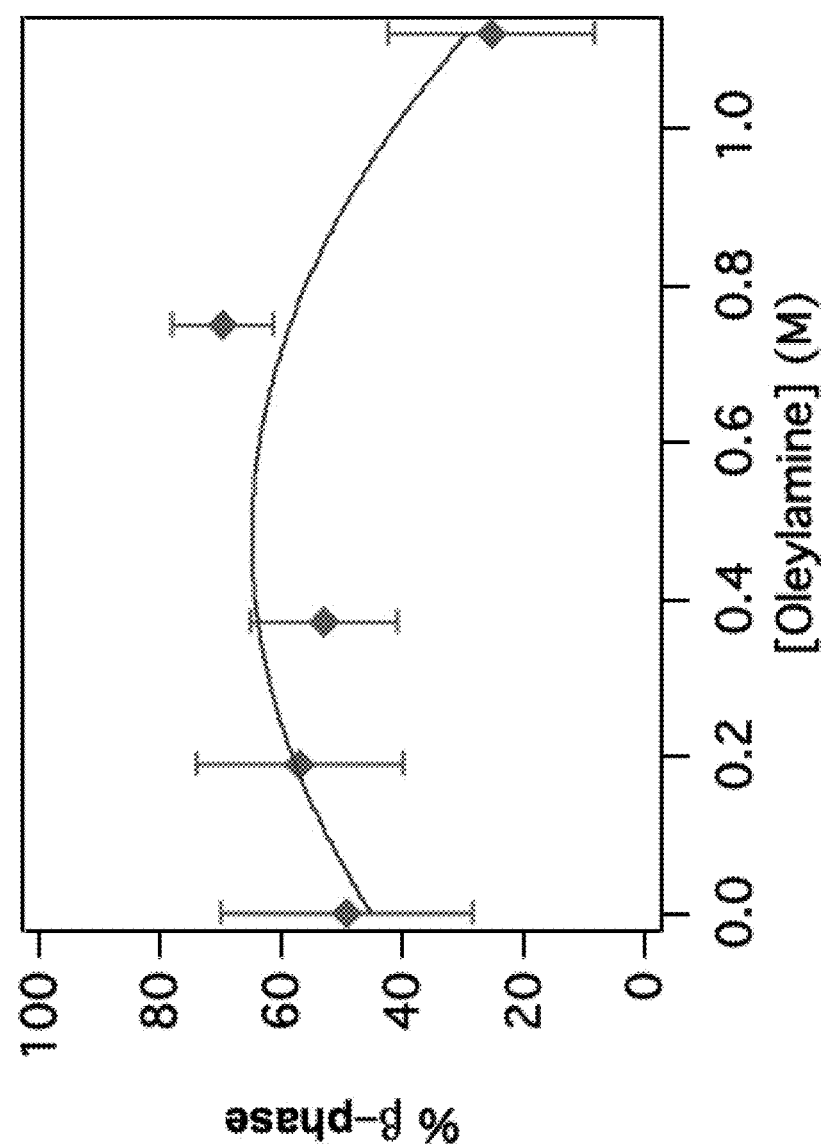
FIG. 9 illustrates percent $\beta$-phase NaYF$_4$ in each reaction, as determined by Rietveld fitting, with increasing OM at 310° C. with 45 min reaction time. Averages of 5-12 runs for each concentration of oleylamine, and error bars show standard deviation according to an embodiment of the invention according to an embodiment of the invention.

While previous reports have suggested that sub-stoichiometric Y$^{3+}$:F$^-$ ratios favor the formation of β-phase NaYF$_4$, it was determined that at reaction temperatures of 310° C. or higher, the 1:4 ratio was ideal for β-phase formation (see FIG. 8). We observed much stronger effects on nanocrystal size and phase by varying the composition of surfactants, with increasing oleylamine concentrations leading to smaller nanocrystals (FIG. 1). The smallest β-NaYF$_4$ nanocrystals, 5 nm in diameter (FIG. 2), could be synthesized in 750 mM oleylamine at 310° C., consistent with previous observations that oleylamine can modulate NaYF$_4$ size. In all of these reactions, we observed a trade-off between smaller size and β-phase formation, with higher temperatures favoring larger nanocrystals and consistent formation of the desired β-NaYF$_4$. Increasing oleylamine concentrations also favored β-NaYF$_4$ formation, allowing for lower reaction temperatures that produce smaller nanocrystals. Surprisingly, at the highest oleylamine concentrations only mixtures were observed (FIGS. 1 and 9).

Figure 3:
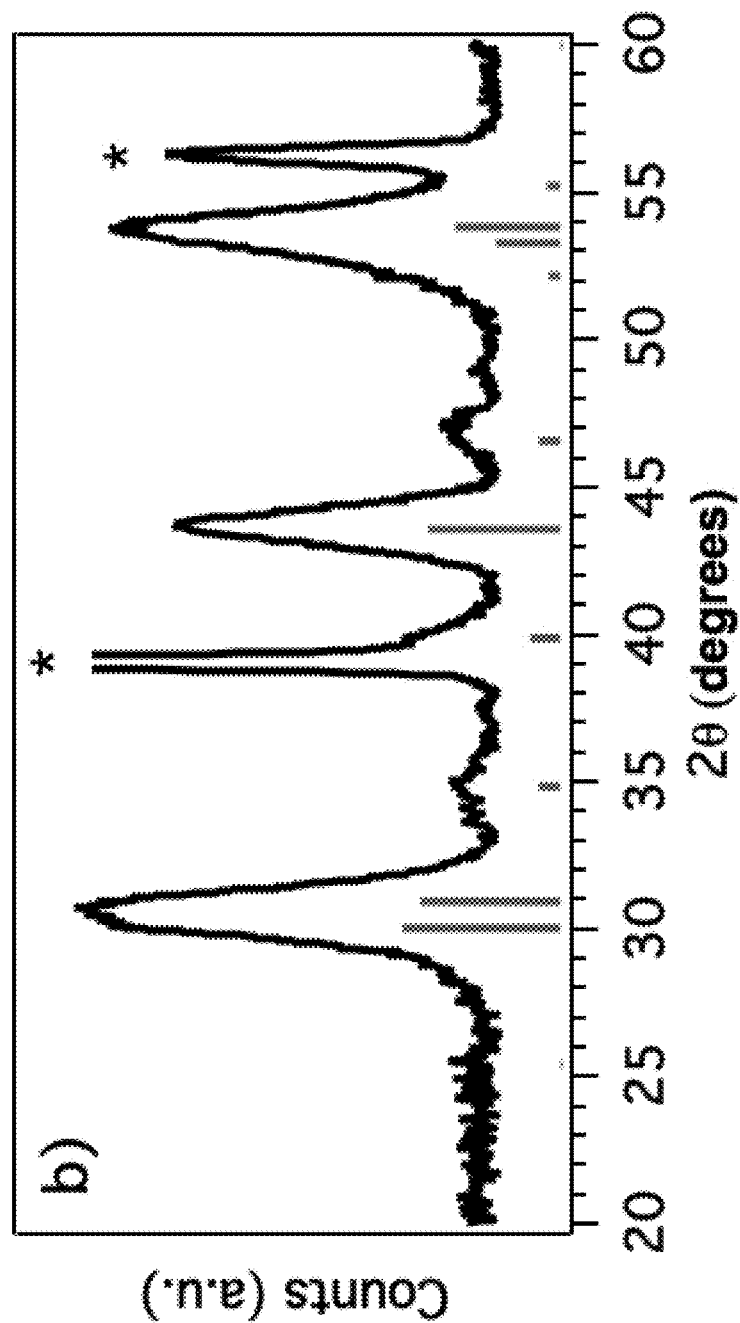
FIG. 3 illustrates Powder XRD of precipated 5-nm nanocrystals, with the standard pattern for $\beta$-NaYF$_4$ shown as green lines. Marked peaks (*) are NaF impurities.

The smallest UCNPs were then characterized. FIG. 3 illustrates TEM images of the β-NaYF$_4$: 2% Er$^{3+}$, 20% Yb$^{3+}$ nanoparticles with an average diameter of 5.4±0.6 nm. Lattice spacing is 3.5 Å. FIG. 3 illustrates Powder XRD of precipitated 5-nm nanocrystals, with the standard pattern for β-NaYF$_4$ shown as green lines. Marked peaks (*) are NaF impurities.

This window of sub-10-nm β-NaYF$_4$ formation could be further refined with changes in reaction time. Increasing reaction time from 15 min to 60 min led to significant increases in the fraction of β-NaYF$_4$ in the presence of oleylamine (FIG. 10), but only small increases in nanoparticle diameter (FIG. 11). The increasing β-phase of the nanoparticles is also shown by an increase in the PL intensity with increasing reaction time (FIG. 12). This increase in β-phase over time is suggestive of a direct α- to β-phase conversion facilitated by heat and oleylamine, although the nature of this transition is not known.

Figure 4:
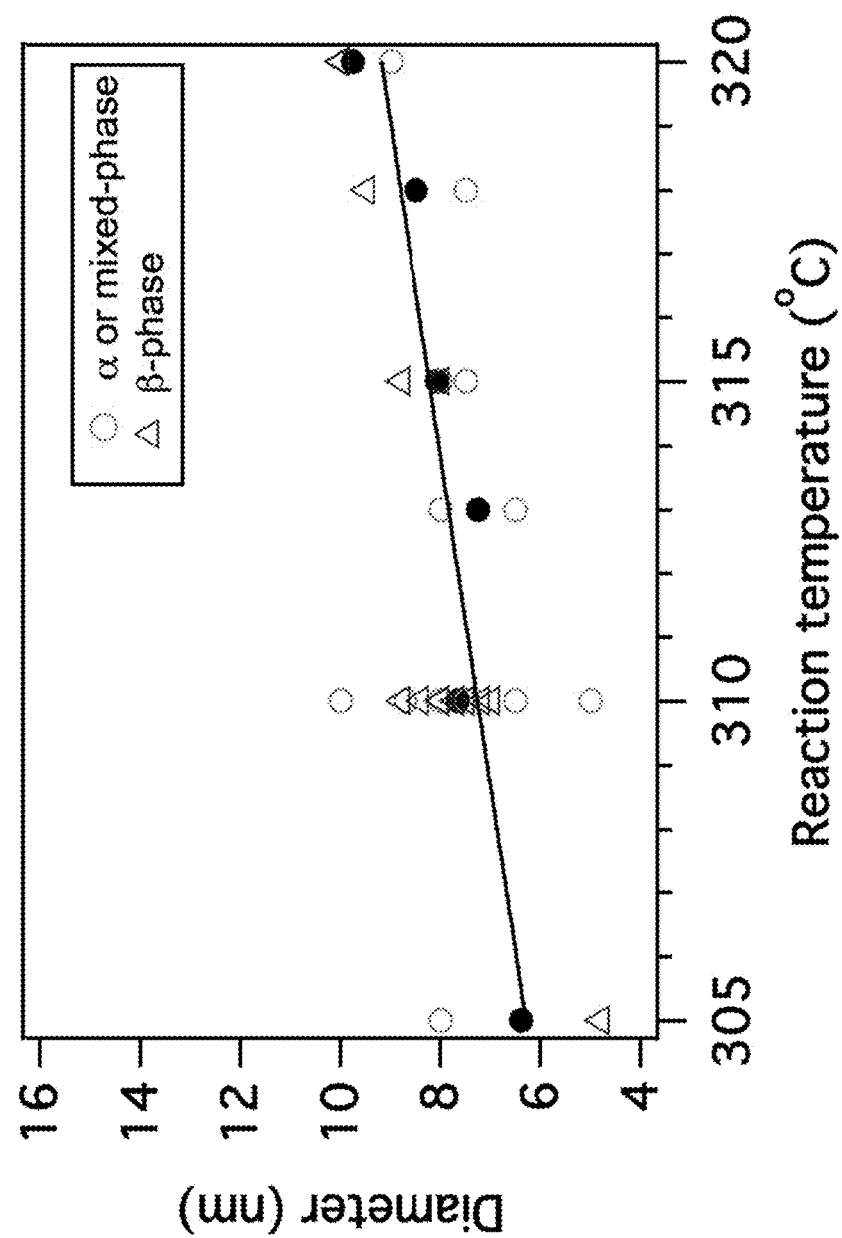
FIG. 4 illustrates the dependence of NaYF$_4$ nanoparticle size and phase on reaction temperature for 45-min reactions with 0.75M oleylamine according to an embodiment of the invention.

We observed some variability in these conditions to consistently produce only β-phase $NaYF_4$, as determined by XRD, with some reactions yielding mixtures of α and β phases. The percentage of β-phase nanoparticles in the mixed-phase samples increases with addition of oleylamine up to 750 mM (FIG. 9). At temperatures above 310° C. the nanoparticles formed are increasingly β-phase (FIG. 13), although this also increases the size of the nanocrystals for a given concentration of oleylamine (FIGS. 4 and 14). Given these constraints, we identified a window in which β-$NaYF_4$ doped with $Yb^{3+}$ and $Er^{3+}$ could be prepared with diameters from 4.5 to 15 nm (FIG. 15), and these particles are easily dispersed in organic solvents such as hexane or chloroform in concentrations, up to 50 mg/mL.

FIG. 4 illustrates the dependence of $NaYF_4$ nanoparticle size and phase on reaction temperature for 45-min reactions with 0.75M oleylamine. β-Phase nanoparticles are shown as blue triangles, α- or mixed phase as orange circles, and average as black closed circles. Sizes determined by dynamic light scattering (DLS).

Figure 16:
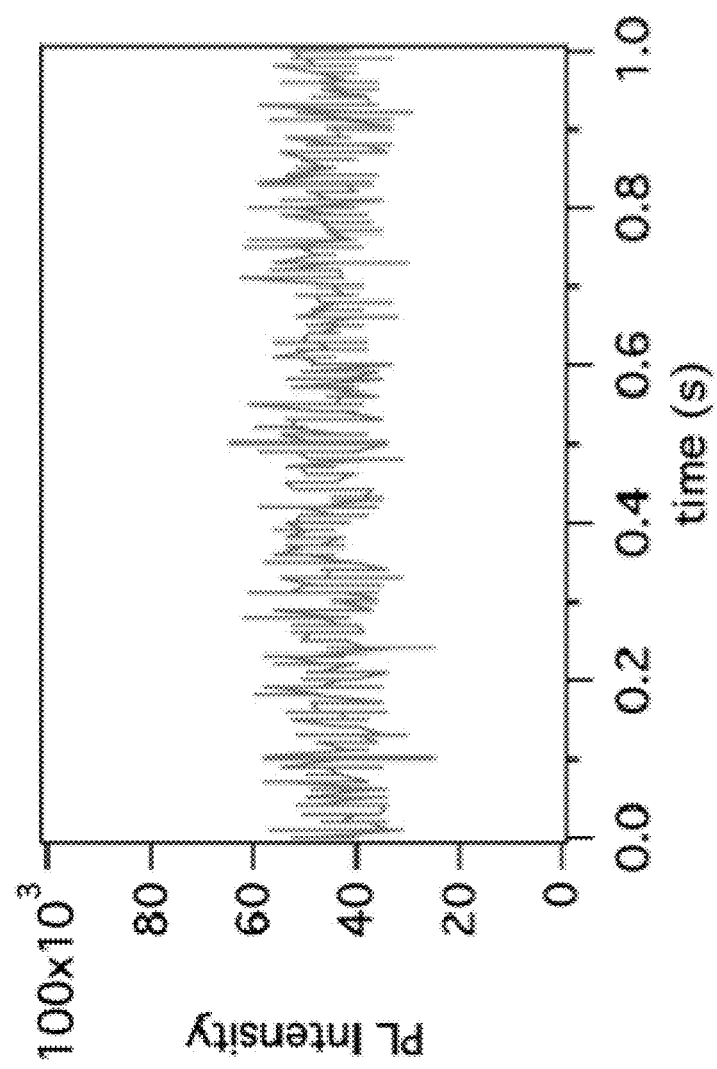
FIG. 16 illustrates the photoluminescence of 5.4 nm core nanoparticles on glass with excitation of 980 nm over 1 s showing the absence of blinking. Data points are every 10 ms according to an embodiment of the invention.

While the optimization of the phase enhances the brightness of these UCNPs, we questioned whether reducing their size would make them susceptible to photobleaching or blinking. Larger β-$NaYF_4$: 2% $Er^{3+}$, 20% $Yb^{3+}$ nanocrystals (ca. 25 nm diameter) can withstand continuous 980-nm excitation at single-particle powers under ambient conditions for over an hour at without any observable photobleaching or blinking, a remarkable stability for phosphors that may be due to the sequestration of a large fraction of the lanthanides within the $NaYF_4$ matrix. Because phosphors exposed to air are prone to quenching and the smaller nanocrystals have a much larger fraction of lanthanides at the nanocrystal surface, we examined whether they share the stability and continuous emission of the larger UCNPs. UCNP luminescence was monitored for over an hour under continuous wave 980-nm excitation at $10^6$ W/cm$^2$ (FIG. 5a), showing that the luminescence from 5-nm nanoparticles remains photostable after prolonged photoexcitation, similar to larger UCNPs. Like the larger nanocrystals, on/off blinking is also not observed (FIG. 16).

Figure 5:
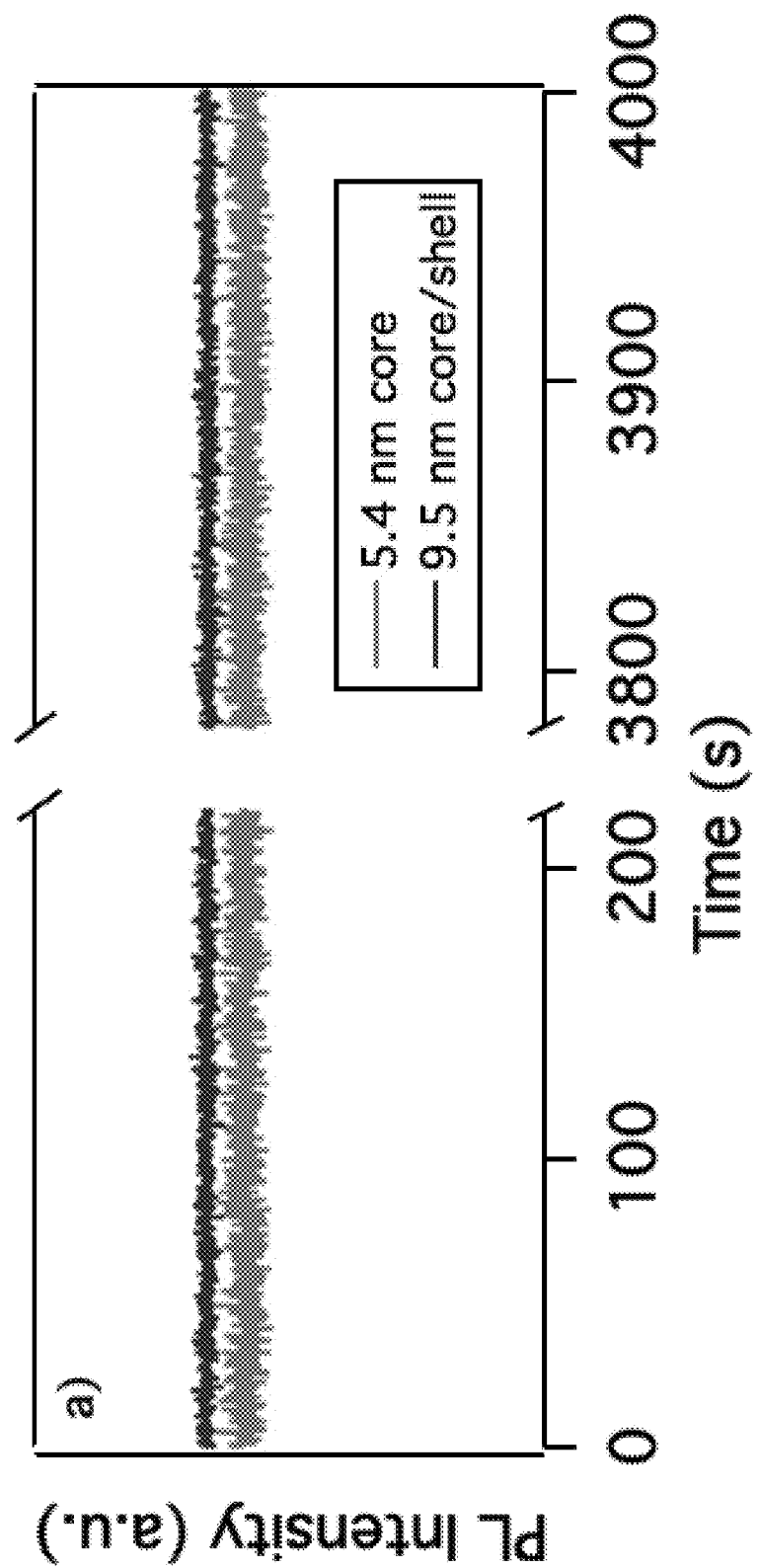
FIG. 5 illustrates the PL stability and uninterrupted emission of $\beta$-NaYF$_4$: 2% Er$^{3+}$, 20% Yb$^{3+}$ core and $\beta$-NaYF$_4$: 2% Er$^{3+}$, 20% Yb$^{3+}$/NaYF$_4$ core/shell heterostructures under 980 nm continuous excitation at powers of $10^6$ W/cm$^2$ according to an embodiment of the invention.
Figure 6:
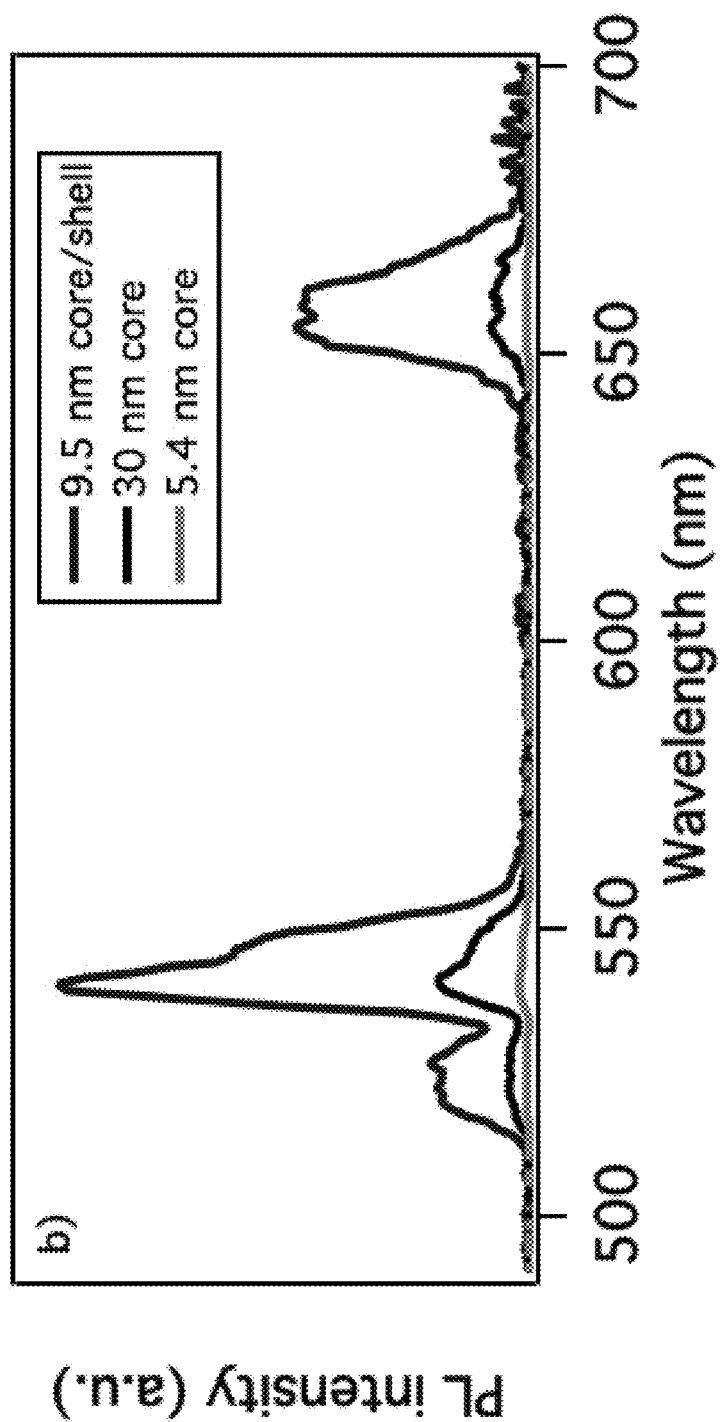
FIG. 6 illustrates the PL intensities ($\lambda_{ex}$=980 nm) of small and larger $\beta$-NaYF$_4$: 2% Er$^{3+}$, 20% Yb$^{3+}$ nanocrystals in hexane compared to core/shell heterostructures.

We did observe that reducing the size of UCNPs cores reduced their brightness, a phenomenon that others have attributed to the coupling of a larger fraction of lanthanide activators to surface vibrational modes that promote non-radiative relaxation. Previous work has shown that addition of a $NaYF_4$ shell without dopants increases the brightness and lifetime of UCNP phosphorescence. A 2-nm shell was added to the 5-nm UCNPs, with the shell thickness confirmed by TEM (FIG. 17) and inductively coupled plasma elemental analysis (ICP) (Table 1). Optical characterization of these core/shell heterostructures confirms that the shell dramatically increases their brightness, conferring >50-fold higher quantum yields (QYs) compared to the 5-nm cores (Table 2), and these heterostructures also do not photobleach or blink (FIGS. 5 and 18). The emission of these heterostructures is in fact larger than that of comparable 30-nm cores, when normalized to the absorbance at 980 nm (FIG. 6).

The increased QY of the core/shell heterostructures likely arises from the dampening of high-energy vibrations originating at the surface by the 2-nm shells, which contain a sufficient number of unit cells (~4) of the low-phonon energy $NaYF_4$ lattice. The outermost 2 nm of a 30-nm core should also passivate the rest of that nanocrystal, but we find that the 30-nm cores exhibit comparable QYs to the smaller core/shell heterostructures. This suggests that energy excited in the $Yb^{3+}$ sensitizers migrates rapidly via $Yb^{3+}$-$Yb^{3+}$ resonant energy transfer to the surface. These analyses demonstrate that synthetic control over UCNP size can enable the determination of critical length scales for vibrational quenching and energy migration in UCNPs.

FIG. 5 illustrates (a) PL stability and uninterrupted emission of β-$NaYF_4$: 2% $Er^{3+}$, 20% $Yb^{3+}$ core and β-$NaYF_4$: 2% $Er^{3+}$, 20% $Yb^{3+}$/$NaYF_4$ core/shell heterostructures under 980 nm continuous excitation at powers of $10^6$ W/cm$^2$, and (b) PL intensities ($\lambda_{ex}$=980 nm) of small and larger β-$NaYF_4$: 2% $Er^{3+}$, 20% $Yb^{3+}$ nanocrystals in hexane compared to core/shell heterostructures. Spectra are normalized to absorbance at 980 nm.

Embodiments of the invention have used a combinatorial screen to identify reaction conditions that permit the synthesis of lanthanide-doped β-$NaYF_4$ nanocrystals with controlled diameters from 4.5 to 15 nm, which are comparable in size to many proteins, making them suitable for a variety of cellular imaging experiments. Embodiments of the invention show that nanocrystals less than $1/4^{th}$ the diameter of previously characterized UCNPs retain their continuous emission and extreme resistance to photobleaching, and that 10-nm core/shell nanocrystals are brighter than 30-nm cores. These findings show that more biocompatible sizes of UCNP can be synthesized without sacrificing brightness or stability. This synthesis should be useful for nanocrystals to be used in extended single-molecule tracking experiments, as well as for novel lanthanide-doped nanocrystals with varying excitation and emission spectra that will be critical for multi-color upconverting imaging.

Nanoparticle Synthesis

Reagents:

Yttrium (III) chloride (anhydrous powder, 99.99%), ytterbium (III) chloride (anhydrous powder, 99.99%), and erbium (III) chloride (anhydrous powder, 99.9%) were purchased from Sigma-Aldrich and stored in a $N_2$ desiccator. Sodium Oleate (Pfaltz and Bauer, 97%) was purchased from VWR. Anhydrous $NH_4F$ was purchased from Sigma-Aldrich and stored under $N_2$. Oleic Acid and 1-octadecene (tech. grade, 90%) were purchased from Sigma-Aldrich. Oleylamine (80-90%) was purchased from Acros.

Flask Synthesis of $NaYF_4$: 20% Yb, 2% Er.

To a 50-mL round bottom flask, yttrium chloride (0.39 mmol, 76.1 mg), ytterbium chloride (0.1 mmol, 27.9 mg) and erbium chloride (0.01 mmol, 2.7 mg) were added. Oleic acid (2.7 g), oleylamine (2 g) and 1-octadecene (3.5 g) were added. (For reactions without oleylamine, 5.5 g of 1-octadecene was added instead of 3.5 g). The solution was stirred and then placed under vacuum and heated to 110° C. for 1 hour. After 1 hour, the reaction was brought under $N_2$. Solid sodium oleate (1.25 mmol, 380 mg) and anhydrous $NH_4F$ (2 mmol, 74 mg) were added under $N_2$. The reaction was then heated to 310° C. The reaction was stirred at 310° C. for 30 min-1 hour under $N_2$ and then cooled rapidly by removal of the heating mantle and air cooling. When the reaction had cooled to 75° C., absolute ethanol (9 mL) was added to the reaction solution to precipitate the $NaYF_4$ 20% Yb, 2% Er nanoparticles. The reaction was transferred to a centrifuge tube and allowed to cool to room temperature. The solution was centrifuged at 3000×g for 2-3 min to precipitate the nanoparticles completely. The supernatant was discarded and the white solid (~80 mg) was suspended in minimal hexanes to break up the pellet. The nanoparticles where then precipitated again with addition of ethanol (~5 mL) and centrifuged at 3000×g for 3 min. This washing procedure was repeated 2 more times to ensure washing of the reaction surfactants as well as any NaF impurities that were formed.

Automated (WANDA) Synthesis of $NaYF_4$:RE:

A stock solution of rare-earth oleate was prepared, for Yb, Er doped $NaYF_4$, by addition of yttrium chloride (3.51 mmol, 685 mg), ytterbium chloride (0.9 mmol, 252 mg) and erbium chloride (0.09 mmol, 25 mg) to a 100 mL round bottom flask. Oleic acid (24.4 g) and 1-octadecene (14.2 g) were added. The suspension was stirred and then placed under vacuum and heated to 110° C. After 1 hour, the stock solution was cooled to room temperature and brought under $N_2$ in a glove box equipped with the automated nanoparticle synthesis robot. To each reaction vial, solid sodium oleate (1.25 mmol, 380 mg) and anhydrous $NH_4F$ (2 mmol, 74 mg) were added, followed by the rare-earth oleate stock solution (4.38 g) and oleylamine (0-10 mmol) and additional 1-octadecene (such that the total mass of ODE+OM=5.5 g). The reaction vials were loaded onto the WANDA platform. The reactors were heated at 30° C./min up to temperatures of 280-330° C. and held at that temperature for 30 min-60 min. The reactors were cooled to 75° C. after which 9 mL of absolute ethanol was added to precipitate the nanoparticles. Aliquots were removed by the robot at appropriate timepoints to monitor the reaction.

Synthesis of Core/Shell $NaREF_4/NaYF_4$:

Undoped $NaYF_4$ shells were grown on the lanthanide-doped cores using a method modified from that of Abel, et al.[27] $YCl_3$ was heated to 110° C. in oleic acid and ODE for 1 hour. The solution was cooled to ~60° C. and the stock solution of nanoparticle cores in hexane was added. The hexane was removed by vacuum then the solution cooled to room temperature after which $NH_4F$ (2 mmol, 74 mg) and sodium oleate (1.25 mmol, 381 mg) were added. The solution was then heated to 280° C. for 30 min, then cooled rapidly and 10 mL of ethanol was added when the solution reached <75° C. Nanoparticles were precipitated and cleaned as described for the UCNP cores.

Characterization

X-Ray Diffraction:

An aliquot (1 mL) of a stock solution of the nanoparticles in hexane was precipitated with addition of ethanol (~2 mL). The nanoparticle slurry was spotted onto glass coverslips or silicon wafers multiple times until an opaque white film formed. The sample was then allowed to air dry completely. XRD patterns were obtained on a Bruker AXS D8 Discover GADDS X-ray Diffractometer system with Cu Kα radiation ($\lambda$=1.5406 Å) from 2θ of 15° to 65°.

For combinatorial screenings, the reaction mixture (250 µL) was spotted onto a glass crystallization plate (Symyx). The nanoparticles were precipitated from the reaction mixture onto the plate by addition of ethanol (~700 µL). The plate was centrifuged to concentrate the precipitated nanoparticles to the bottom of the wells. The supernatant was removed with a pipette and the plate dried in a vacuum desiccator overnight. XRD patterns were obtained on each sample directly on the glass plate from 2θ of 15° to 65°. For Rietveld refinement, fitting of the XRD patterns to α and β-phase $NaYF_4$ was performed in PANalytical X'Pert HiScore Plus software. Due to the peak broadening for the small nanocrystals, fittings of samples containing 8% or less of each phase may appear identical to that of the pure phase Photoluminescence Spectroscopy:

The emission spectra of the $NaYF_4$: 20% Yb, 2% Er nanoparticles were recorded on a Horiba-Jobin Yvon Fluorolog II modified with a fiber-coupled 1 W continuous wave 980-nm laser excitation source (Sheaumann) and a Micromax 96-well plate reader. The photoluminescence was measured in solid-state samples spotted onto either a clear polypropylene 96-well plate or onto a 96-well glass crystallization plate (Symyx).

For determination of PL quantum yields, the UCNP stock solutions in hexane (500 µL) were placed in a quartz sample holder, which was inserted into an integrating sphere (Horiba Jobin-Yvon). The excitation laser to the integrating sphere and the emission to the Fluorolog II were routed using fiber optics. The excitation intensity was measured after passing through a 2.5% neutral density filter. Excitation and emission spectra were corrected for the sensitivity of the detector over the appropriate wavelengths.

Photostability measurements of UCNP photoluminescence were performed by exciting a thin film of UCNPs on a glass coverslip with a 980 nm continuous-wave laser (Thorlabs TCLDM9, 300 mW diode) at $10^6$ W/cm$^2$. A high numerical-aperture objective (Nikon Plan Apo, 100×, 1.4 oil) was used to focus the laser and collect PL emission, which was then routed in free space to an avalanche photo diode (Micro Photon Devices, PDM series SPAD) for PL intensity measurements. A 750 nm short pass filter (Thorlabs) was used to filter residual excitation light after collection. The excitation density was determined from the measured laser power at the back aperture of the objective and the area of the focused excitation spot. PL intensity was recorded over 4000 sec by a 1 MHz digital counter (RHK Technologies) measuring photon counts from the SPAD.

Lifetime Measurements.

Time-resolved measurements of the PL emission from UCNPs were performed by modulating the excitation laser with a function generator (SRS, Model DS340) connected to a voltage amplifier (SRS, Model SIM983). The laser-pulse edge and rep-rate were 1 µs and 250 Hz, allowing a 2 ms window for PL decay. The measured photon counts from the SPAD and the trigger signal from the function generator were recorded simultaneously by a Time Correlated Single Photon Counter (TCSPC) (PicoQuant, PicoHarp 300). The time-arrival of PL emission referenced to laser-pulse edge was calculated using a software program customized in MatLab.

Dynamic Light Scattering (DLS):

The size of the nanocrystals was determined by DLS measurements on a Malvern Zetasizer. Samples were prepared from hexane stock solutions of the $NaYF_4$ 20% Yb, 2% Er nanoparticles by dilution with hexane and filtered through a PTFE 0.2 µm syringe filter (Pall) into a quartz cuvette. The diameters of the nanoparticles in each sample were determined based on the fitting by volume.

Electron Microscopy (STEM and TEM):

For electron microscopy, dilute samples (7 µL) of nanoparticles in hexanes were dropped onto Ultrathin Carbon Film/Holey Carbon, 400 mesh copper or 300 mesh Au grids (Ted Pella, Inc.). The grids were washed with ethanol and then hexanes. Images of the nanoparticles were obtained using a Zeiss Gemini Ultra-55 Analytical Scanning Electron Microscope. Dark-field images were collected in transmission (STEM) mode with 30 kV beam energy. TEM images were also obtained using a JEOL 2100-F 200 kV Field-Emission Analytical Transmission Electron Microscope.

Elemental Analysis with ICP:

The amounts of Na, Y, Yb, and Er in each sample were determined with ICP. Samples and standards were analyzed on a Varian 720-ES ICP Optical emission Spectrometer. Standards (Sigma Aldrich) were diluted in 7% nitric acid to give standards with a concentrations from 200 ppb to 5 ppm. Samples of UCNPs (1 mL of stock in hexane, ~5 mg/mL) were digested with concentrated nitric acid (1-2 mL) and stirred with gentle heating (50° C.). The samples were then diluted by addition to 8 mL of water.

Figure 7:
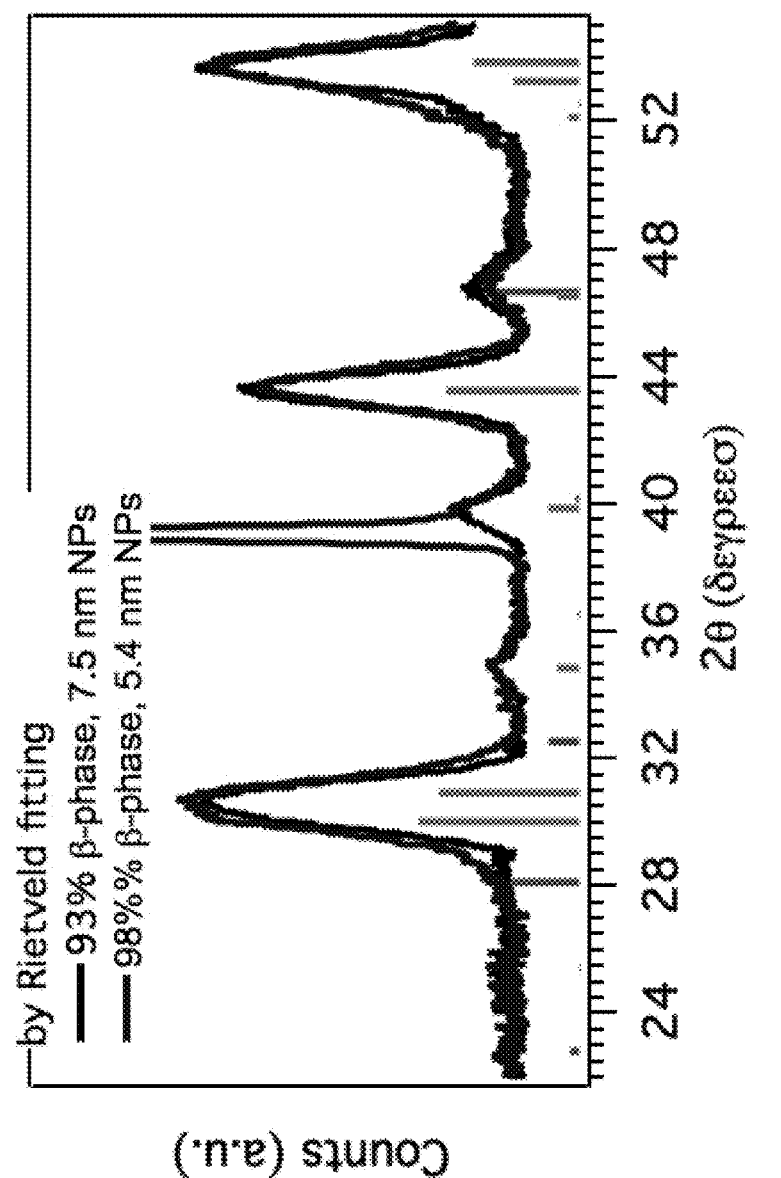
FIG. 7 illustrates the XRD of samples prepared determined to have 93% $\beta$-phase (black) and 98% $\beta$-phase (blue) by Rietveld fitting. The 5.4 nm nanocrystals (blue) show more intensity at 2θ=28 degrees compared to the 7.5 nm nanocrystals, yet are determined to have less % $\beta$-phase. This shows the error in the determination of % phase using Rietveld fitting, as well as peak broadening observed for the smaller nanocrystals according to an embodiment of the invention.

FIG. 7 illustrates the XRD of samples prepared determined to have 93% β-phase (black) and 98% β-phase (blue) by Rietveld fitting. The 5.4 nm nanocrystals (blue) show more intensity at 2θ=28 degrees compared to the 7.5 nm nanocrystals, yet are determined to have less % β-phase. This shows the error in the determination of % phase using Rietveld fitting, as well as peak broadening observed for the smaller nanocrystals.

FIG. 8 illustrates XRD of samples prepared with a 1:4 (black) and 1:8 (blue) $Y^{3+}$ to $F^-$ ratio at 310° C. heated for 45 min. The sample with 1:8 ratio shows many other impurities besides the α or β-phase $NaYF_4$.

FIG. 9 illustrates the percent β-phase $NaYF_4$ in each reaction, as determined by Rietveld fitting, with increasing OM at 310° C. with 45 min reaction time. Averages of 5-12 runs for each concentration of oleylamine, and error bars show standard deviation.

Figure 10:
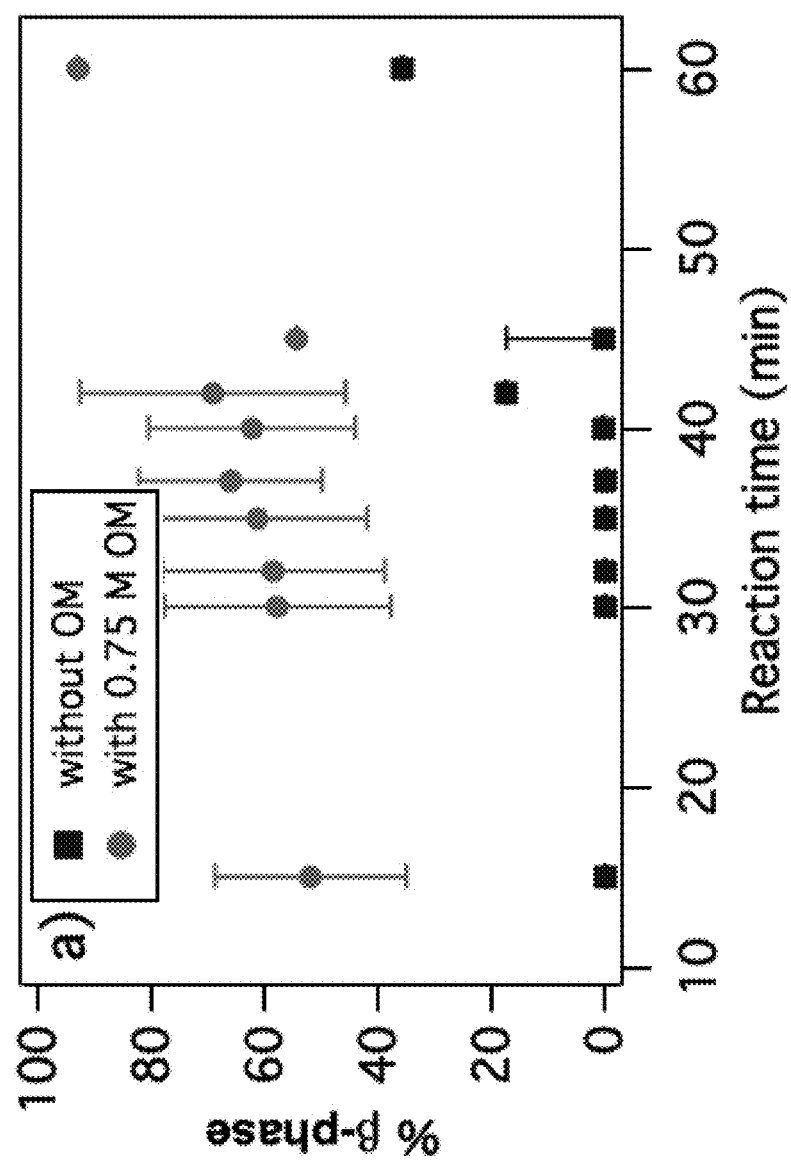
FIG. 10 illustrates the effect of reaction time at 310° C. on the a) % of β-phase NaYF$_4$ in each reaction according to an embodiment of the invention.
Figure 11:
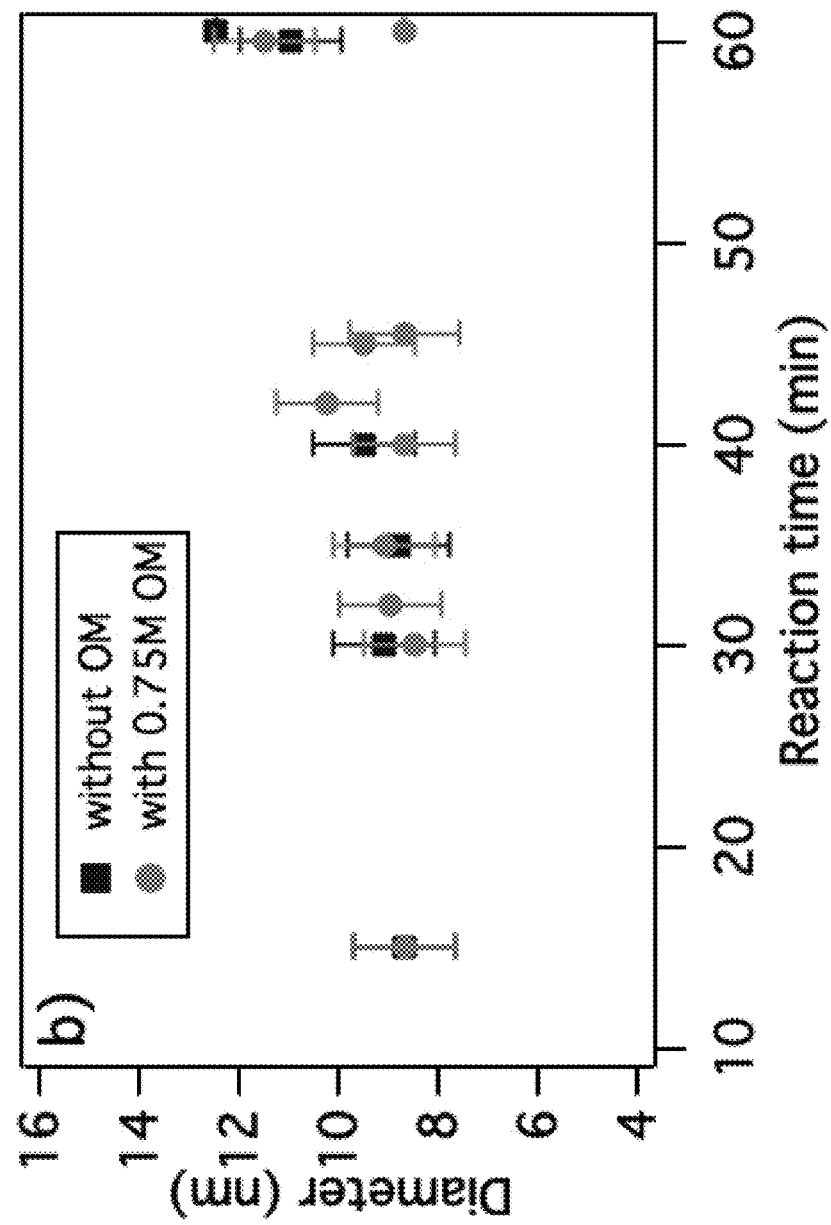
FIG. 11 illustrates the size of the nanocrystals with (orange circles) and without (blue squares) 0.75 M oleylamine. Percent β-phase as determined by Rietveld fitting of powder X-ray diffraction and size determined by DLS according to an embodiment of the invention according to an embodiment of the invention.
Figure 12:
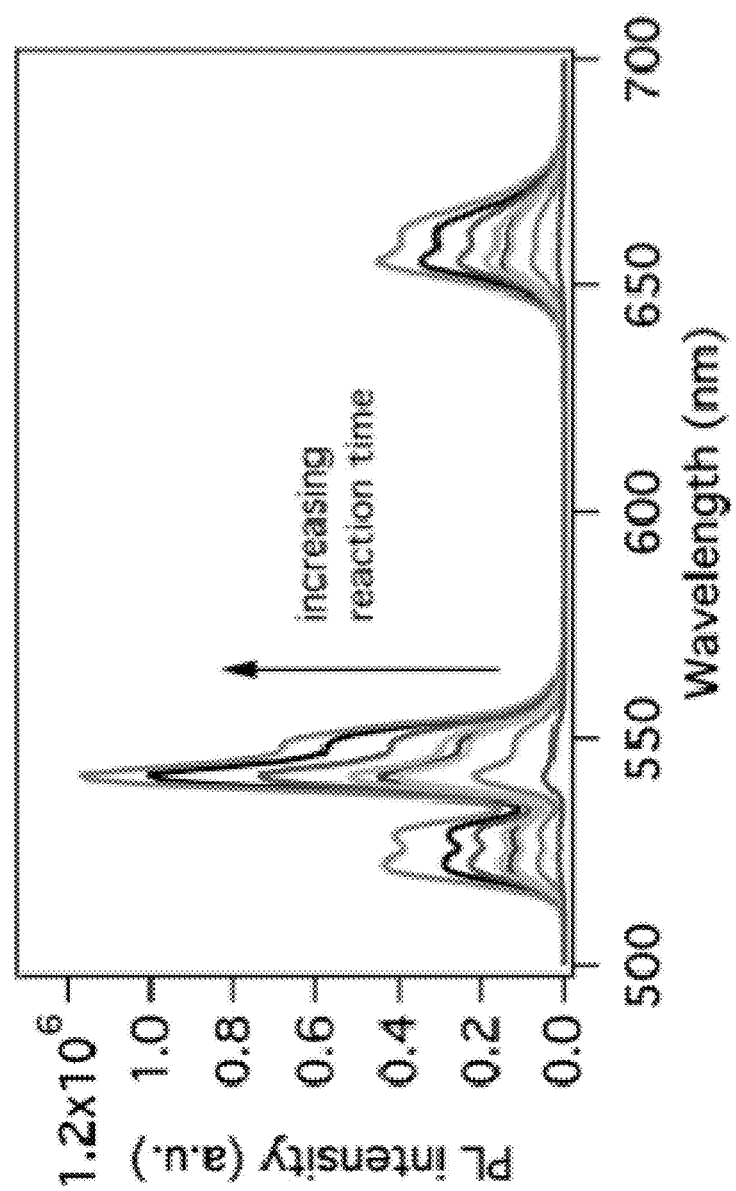
FIG. 12 illustrates the photoluminescence after 980 nm excitation for 250-μL aliquots of a reaction in xylene with increasing reaction time from 15 to 60 minutes at 310° C. with 0.75 oleylamine according to an embodiment of the invention according to an embodiment of the invention.

FIG. 10 illustrates the effect of reaction time at 310° C. on the % of β-phase $NaYF_4$ in each reaction and FIG. 11 illustrates the effect of reaction time at 310° C. on the size of the nanocrystals with (orange circles) and without (blue squares) 0.75 M oleylamine. Percent β-phase as determined by Rietveld fitting of powder X-ray diffraction and size determined by DLS.

FIG. 12 illustrates the Photoluminescence after 980 nm excitation for 250-μL aliquots of a reaction in xylene with increasing reaction time from 15 to 60 minutes at 310° C. with 0.75 oleylamine.

Figure 13:
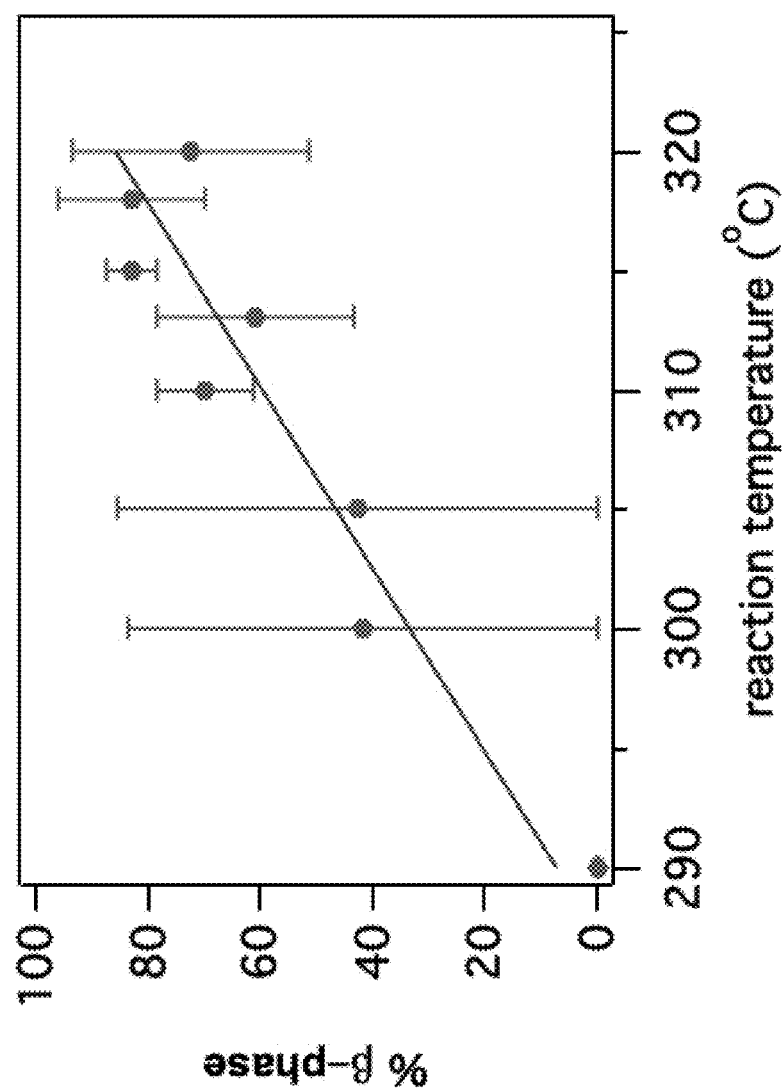
FIG. 13 illustrates the percent β-phase NaYF$_4$ in each reaction, as determined by Rietveld fitting, with increasing reaction temperature with 750 mM OM and 45 min reaction time. Averages of 5-12 runs for each concentration of oleylamine, and error bars show standard deviation according to an embodiment of the invention.
Figure 14:
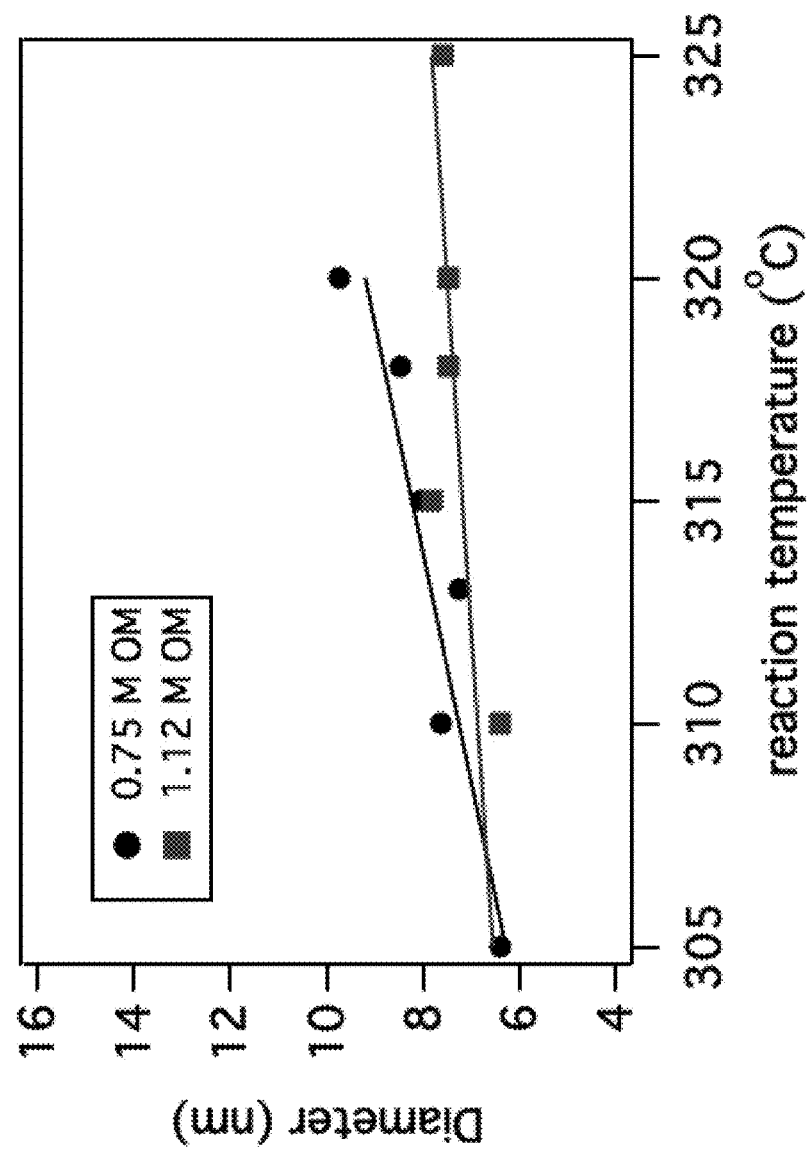
FIG. 14 illustrates the comparison of the dependence of NaYF$_4$ nanoparticle size and phase on reaction temperature for 45-min reactions with 0.75M oleylamine (black circles) and 1.12M oleylamine (red squares). Sizes determined by DLS according to an embodiment of the invention.

FIG. 13 illustrates the percent β-phase $NaYF_4$ in each reaction, as determined by Rietveld fitting, with increasing reaction temperature with 750 mM OM and 45 min reaction time. Averages of 5-12 runs for each concentration of oleylamine, and error bars show standard deviation.

FIG. 14 illustrates comparison of the dependence of $NaYF_4$ nanoparticle size and phase on reaction temperature for 45-min reactions with 0.75M oleylamine (black circles) and 1.12M oleylamine (red squares). Sizes determined by DLS.

Figure 15:
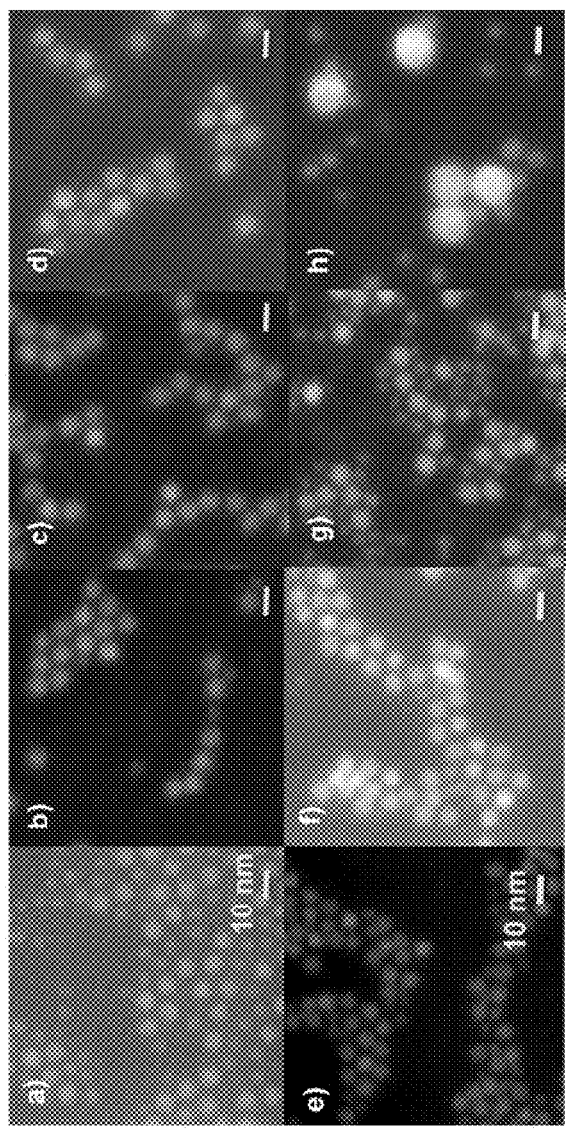
FIG. 15 illustrates the scanning transmission electron microscopy (STEM) images of representative β-NaYF$_4$ nanoparticle samples at each reaction temperature of a) 310° C. b) 315° C., c) 318° C. and d) 320° C. and at different oleylamine concentrations e) 0.112M, f) 0.75M, g) 0.37M and h) no oleylamine. Average diameters of the nanoparticle synthesized at these temperatures and oleylamine concentrations are a) 6.0 nm, b) 6.1 nm, c) 7.0 nm, d) 8.0 nm, e) 6.25 nm, f) 7.1 nm, g) 6.0 nm, h) 14.0 nm. Scale bar in each image is 10 nm according to an embodiment of the invention.

FIG. 15 illustrates a scanning transmission electron microscopy (STEM) images of representative β-$NaYF_4$ nanoparticle samples at each reaction temperature of a) 310° C. b) 315° C., c) 318° C. and d) 320° C. and at different oleylamine concentrations e) 0.112M, f) 0.75M, g) 0.37M and h) no oleylamine. Average diameters of the nanoparticle synthesized at these temperatures and oleylamine concentrations are a) 6.0 nm, b) 6.1 nm, c) 7.0 nm, d) 8.0 nm, e) 6.25 nm, f) 7.1 nm, g) 6.0 nm, h) 14.0 nm. Scale bar in each image is 10 nm.

FIG. 16 illustrates a photoluminescence of 5.4 nm core nanoparticles on glass with excitation of 980 nm over 1 s showing the absence of blinking. Data points are every 10 ms.

Figure 17:
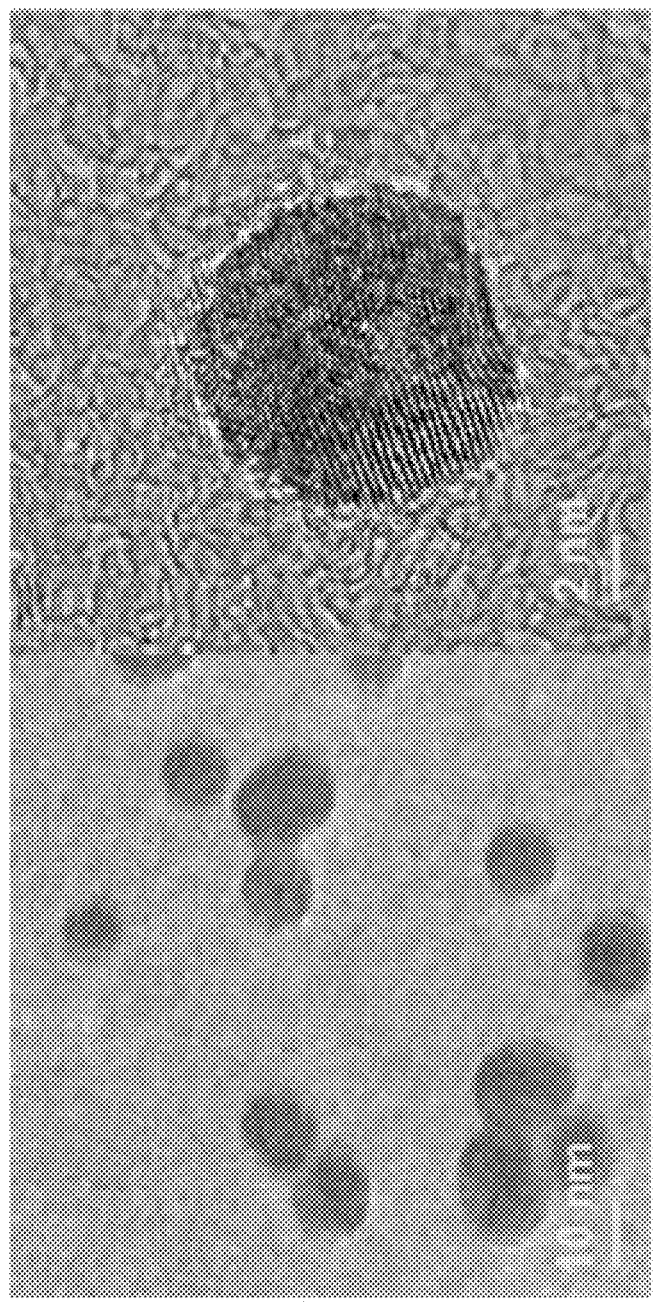
FIG. 17 illustrates the TEM of the core/shell β-NaYF$_4$: 20% Yb, 2% Er/β-NaYF$_4$ nanoparticles. Average diameter of the nanoparticles is 9.5±2 nm. (b) Powder X-ray diffraction showing that the core/shell nanocrystals remain β-NaYF$_4$ according to an embodiment of the invention.
Figure 18:
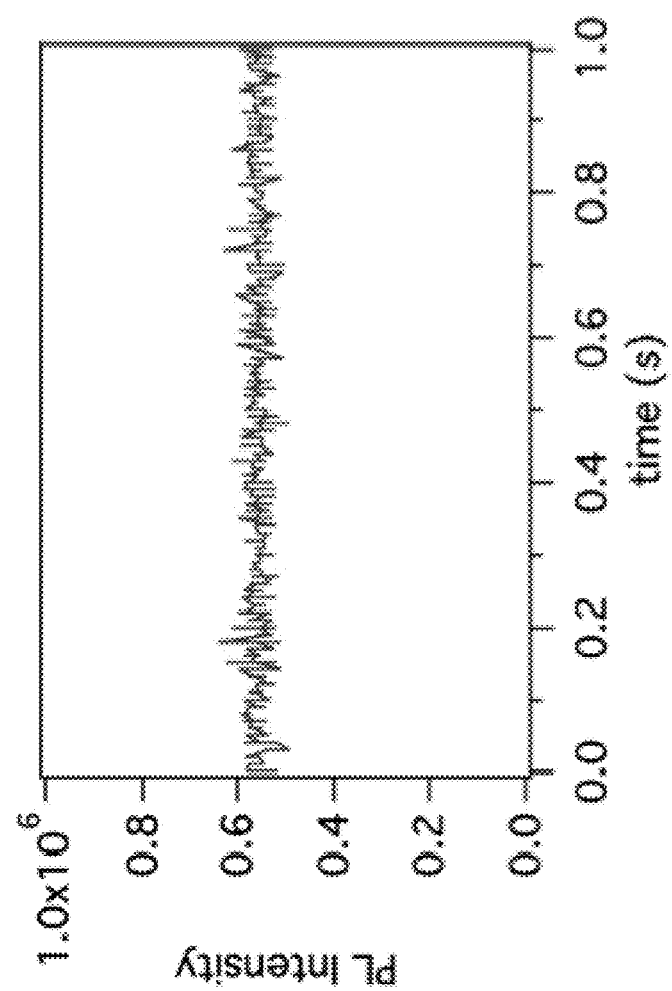
FIG. 18 illustrates the photoluminescence of 9.5 nm core/shell nanoparticles on glass with excitation of 980 nm over 1 s showing the absence of blinking. Data points are every 10 ms according to an embodiment of the invention.

FIG. 17 illustrates a TEM of the core/shell β-$NaYF_4$: 20% Yb, 2% Er/β-$NaYF_4$ nanoparticles. Average diameter of the nanoparticles is 9.5±2 nm. (b) Powder X-ray diffraction showing that the core/shell nanocrystals remain β-$NaYF_4$.

Referring to Table 1, the theoretical values for the core/shell are those based on the amount of core and shell by volume expected for core nanocrystals of 5.4 nm with a 2 nm shell as is seen in TEM. Experimental values suggest a thinner shell of ~1.5 nm. Given the polydispersity of the core/shell sample, this fits within the expected range.

TABLE 1

Elemental analysis of core and core/shell nanoparticles as determined by ICP

| element | 5 nm core (experimental) | 5 nm core (theoretical) | 9.5 nm Core/shell (Experimental) | 9.5 nm Core/shell (theoretical) |
|---|---|---|---|---|
| Na | 1.5 | 1 | 1.0 | 1 |
| Y | 0.79 | 0.78 | 0.92 | 0.85 |
| Yb | 0.18 | 0.20 | 0.064 | 0.038 |
| Er | 0.017 | 0.020 | 0.006 | .0038 |

TABLE 2

Photoluminescence quantum yields and lifetimes for the 5-nm diameter β-phase $NaYF_4$:20% Yb, 2% Er core nanoparticles, 9-nm diameter β-phase $NaYF_4$:20% Yb, 2% Er/$NaYF_4$ core/shell nanoparticles, and 30-nm cores. $Q^Y$ measured with laser power of ~$10^3$ W cm$^{-2}$.

| | $QY^1$ (%) | Lifetimes ($\mu s$)$^2$ | relative brightness @540 nm |
|---|---|---|---|
| 5 nm core | 0.021 | 40 | 0.12 |
| 9.5 nm core/shell | 1.4 | 176 | 5.7 |
| 30 nm core | 0.025 | 204 | 1 |

[1]QY measured with laser power of ~$10^3$ W cm$^{-2}$
[2]Lifetime measured at power of $10^6$ W cm$^{-2}$ FIG. 18 illustrates the photoluminescence of 9.5 nm core/shell nanoparticles on glass with excitation of 980 nm over 1 s showing the absence of blinking. Data points are every 10 ms.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

What is claimed is:

1. A phosphorescent upconverting sub-10 nm nanoparticle comprising:
    a lanthanide-doped hexagonal β-phase sodium yttrium fluoride $NaYF_4$:$Er^{3+}$/$Yb^{3+}$ sub-10 nm nanocrystal.

2. The phosphorescent upconverting nanoparticle of claim 1, wherein the hexagonal β-phase $NaYF_4$ nanocrystal comprises a 1:1:4 stoichiometry of $Na^+$, $Y^{3+}$, and $F^-$, respectively.

3. The phosphorescent upconverting nanoparticle of claim 1, wherein the nanoparticle is a 2% $Er^{3+}$, 20% $Yb^{3+}$ lanthanide-doped hexagonal β-phase $NaYF_4$ nanocrystal.

4. The phosphorescent upconverting nanoparticle of claim 1, wherein the sub-10 nm nanoparticle has a lattice spacing of approximately 3.5 Å.

5. The phosphorescent upconverting nanoparticle of claim 1, wherein the sub-10 nm nanoparticle has an average diameter of 5.4±0.6 nm.

6. The phosphorescent upconverting nanoparticle of claim 1, wherein the hexagonal β-phase $NaYF_4$ nanocrystal comprises a core/shell heterostructure with a $NaYF_4$ shell.

7. The phosphorescent upconverting nanoparticle of claim 6, wherein the hexagonal β-phase $NaYF_4$ nanocrystal comprises a core/shell heterostructure with an approximately 2 nm thick $NaYF_4$ shell.

8. The phosphorescent upconverting nanoparticle of claim 6, wherein the hexagonal β-phase $NaYF_4$ nanocrystal comprises β-$NaYF_4$: 2% $Er^{3+}$, 20% $Yb^{3+}$/$NaYF_4$ core/shell heterostructure.

9. A method of making phosphorescent upconverting sub-10 nm lanthanide-doped hexagonal β-phase $NaYF_4$: $Er^{3+}$/$Yb^{3+}$ nanocrystals comprising:
  preparing a stock solution of rare-earth oleates for Yb, Er doped $NaYF_4$ by addition of yttrium chloride, ytterbium chloride and erbium chloride to a flask;
  adding oleic acid and 1-octadecene to the flask;
  stirring the suspension and heating to 110° C. for 1 hour;
  cooling the stock solution to room temperature;
  mixing solid sodium oleate and anhydrous $NH_4F$, and the rare-earth oleate stock solution and adding oleylamine and additional 1-octadecene to form a mixture in the flask;
  heating the mixture to a prescribed temperature between 280-330° C. and holding the mixture at the prescribed temperature for 30 min-60 min; and
  cooling the mixture to 75° C. after which absolute ethanol is added to precipitate the $NaYF_4$:$Er^{3+}$/$Yb^{3+}$ sub-10 nm nanocrystals.

10. A method according to claim 9, wherein the prescribed temperature is approximately 310° C.

11. A method according to claim 9, wherein the prescribed temperature is approximately 330° C.

12. A method according to claim 9, wherein undoped $NaYF_4$ shells are grown on the lanthanide-doped core nanocrystals, further comprising:
  heating $YCl_3$ to 110° C. in oleic acid and 1-octadecene for 1 hour to form a second stock solution;
  cooling the second stock solution to approximately 60° C.;
  adding a third stock solution of nanoparticle cores comprising the precipitated nanocrystals in hexane;
  removing the hexane by vacuum and cooling the third solution to room temperature after which $NH_4F$ and sodium oleate are added;
  heating the third stock solution to 280° C. for 30 min, then cooling rapidly and adding ethanol when the third stock solution reaches approximately 75° C. to precipitate core-shell nanoparticles.

* * * * *